United States Patent [19]

McCarthy

[11] 4,080,137
[45] Mar. 21, 1978

[54] APPARATUS FOR FORMING BODIES WITH AN ARCUATE TOP AND A FLAT BOTTOM

[75] Inventor: John P. McCarthy, New York, N.Y.

[73] Assignee: DCA Food Industries Inc., New York, N.Y.

[21] Appl. No.: 644,037

[22] Filed: Dec. 24, 1975

[51] Int. Cl.² ............................................. A21C 11/16
[52] U.S. Cl. ..................................... 425/311; 425/287
[58] Field of Search ............... 425/465, 466, 308, 287, 425/310, 288, 311, 381, 325, 292, 461

[56] References Cited

U.S. PATENT DOCUMENTS

| Re. 19,557 | 5/1935 | Bauman | 425/287 |
| 1,814,951 | 7/1931 | Muller | 425/287 X |
| 1,870,654 | 8/1932 | Schoel | 425/288 |
| 2,126,416 | 8/1938 | Schlichter | 425/288 |
| 3,396,677 | 8/1968 | Adams et al. | 425/288 |
| 3,695,802 | 10/1972 | Gilmore | 425/287 |
| 3,947,178 | 3/1976 | Belshaw et al. | 425/287 X |

Primary Examiner—Francis S. Husar
Assistant Examiner—William R. Briggs
Attorney, Agent, or Firm—Amster & Rothstein

[57] ABSTRACT

An apparatus is provided for forming a plastic food material into bodies having an arcuate top and a flat bottom. The apparatus includes a cylindrical nozzle body for receiving the food material from a pressurized source. In the periphery of the nozzle body is included a food material forming orifice having a plane lower bounding surface contiguous thereto which lies within the nozzle body in a plane inclined downward towards the exterior of the nozzle body. A cutter sleeve is mounted on the nozzle body and moved relative to it to selectively cover and uncover the orifice. The apparatus imparts a curved contour to the top of the pressurized food material escaping from the orifice, while the inclined plane lower bounding surface imparts a flat bottom to the material.

11 Claims, 5 Drawing Figures

APPARATUS FOR FORMING BODIES WITH AN ARCUATE TOP AND A FLAT BOTTOM

The present invention relates generally to a machine for the manufacture of a formed food product of a particular shape, and in particular to an apparatus for forming bodies with an arcuate top and a substantially flat bottom.

Various machines for forming shaped food products have been available, for example, machines for forming meat and fish patties and for forming dough into a toroid to produce a doughnut. Recently, the production of onion rings by forming the rings from comminuted onion particles has been made possible by the development of methods and apparatus for forming such particulate mixtures. Also, an apparatus is available for producing imitation shrimp by forming shrimp particles to produce a wedge-shape crescent.

Preparation of comestibles by the use of the above-identified methods and apparatus has contributed greatly to reducing the cost of certain of the above-noted, much desired consumer products. However, none of these apparatus is capable of producing a solid with an arcuate top and a substantially flat bottom. They would, therefore, be unacceptable for producing comestibles which the consumer expects to find in that shape, for example, imitation chicken breasts and various pastries. Appeal to the consumer and, therefore, the saleability of imitation food products are substantially enhanced by simulating the appearance of the real product in addition to simulating the taste thereof.

It is an object of the present invention to provide an apparatus for forming a body with an arcuate top and a substantially flat bottom.

It is another object of the present invention to provide an apparatus for forming a body with an arcuate top and a substantially flat bottom and simulating the appearance of, for example, chicken breasts which may be produced in uniform repetitive shapes, the size of which may be varied while maintaining the basic shape thereof.

In accordance with the invention, bodies with a substantially flat bottom can be formed from a plastic material by forcing the material through an aperture with a lower bounding surface contiguous thereto, which surface lies in a substantially inclined plane and is arranged so that the escaping material can slide down the surface and out of the aperture. In accordance with an illustrative embodiment demonstrating objects and features of the present invention, there is provided an apparatus for forming a plastic foodstuff into a crescentic body having a substantially flat bottom and an arcuate top. The foodstuff is received in an elongated cylindrical nozzle body which is closed at one end but includes an orifice in its periphery contiguous to that end. The orifice has the shape of a wedge cut from the periphery of the nozzle body by two intersecting planes having a line of intersection perpendicular to the axis of the nozzle body, with the lower plane being substantially inclined downward toward the exterior of the nozzle body. A cutter is arrranged for movement with respect to the nozzle body so as to selectively close off the orifice. By this arrangement, a curved top can be imparted to material forced through the orifice while the inclined plane surface at the bottom of the orifice imparts a flat bottom to the exiting material.

The above brief description and further objects, features and advantages of the invention will be more fully understood by reference to the following detailed description of the presently preferred, but nonetheless illustrative, embodiment is accordance with the present invention, when taken in conjunction with the accompanying drawing in which.

Conventional apparatus for forming bodies with arcuate tops from pressurized plastic material have a nozzle body with a forming orifice bounded from below by a surface which is substantially perpendicular to the nozzle body and which lies, generally, in a horizontal plane. When the plastic material is formed by passage through such an orifice, it tends to have a curved bottom. It has been found that this curved bottom is caused by the horizontal orientation of the lower bounding surface. Moreover, experiment has shown that if the lower bounding surface, of the orifice, lies in a plane and is substantially inclined downward toward the exterior of the nozzle body, the bottom curvature of the formed material can be eliminated. Increasing the pressure of the plastic material helps to eliminate all traces of bottom curvature.

Figure 2:
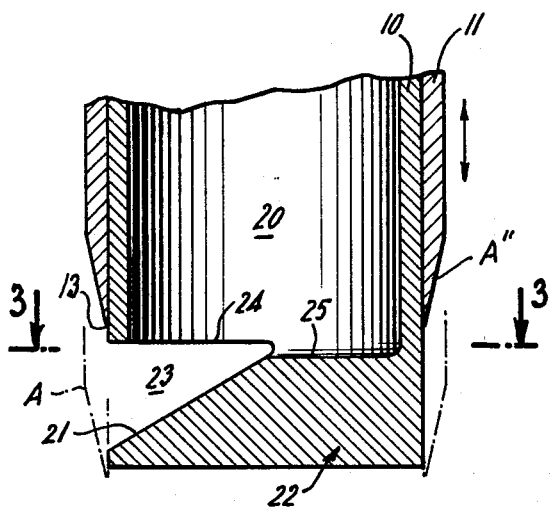
FIG. 2 is an enlarged sectional view of the lower portion of the apparatus in FIG. 1 and shows some of the details of the internal structure thereof.
Figure 1:
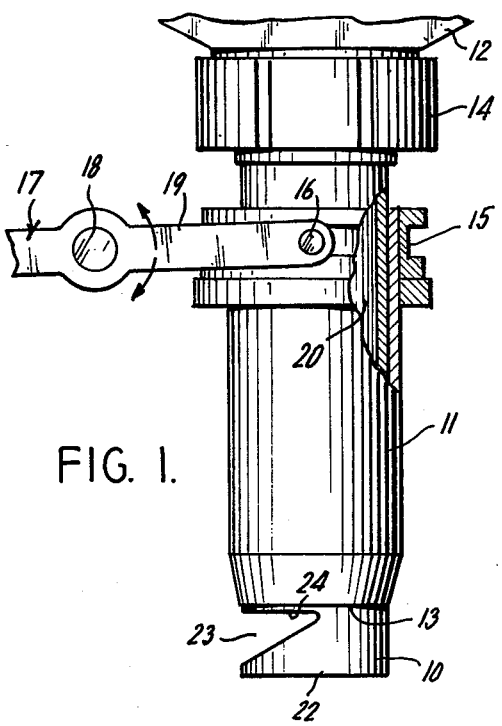
FIG. 1 is a side elevational view of a forming apparatus in accordance with the present invention for producing crescentic bodies of the shape described.
Figure 5:
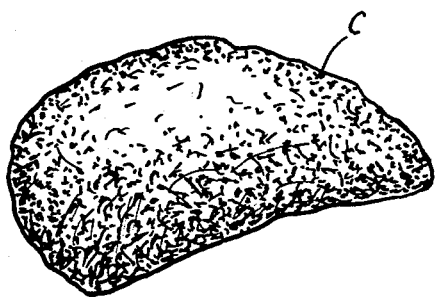

Referring now to the drawing and first to FIGS. 1 and 2, there is shown an illustrative apparatus, which embodies the objects and features of the present invention, for forming, from a plastic foodstuff material, a crescent C having an arcuate top and a substantially flat bottom as shown in the perspective drawing of FIG. 5.

The forming apparatus includes a generally cylindrical, elongated nozzle body 10 which is supported in a stationary position in any convenient fashion, such as by being attached to a stationary frame or chassis of a machine. At its upper end, the nozzle body 10 communicates with the outlet of a pressurized tank 12 which supplies, under pressure, the plastic foodstuff material to be formed into crescents. A conventional coupling 14 secures the top of nozzle body 10 to the outlet of the tank 12. The nozzle body 10 has a closed bottom 22 but includes a wedge-shaped orifice 23 within the lower end of its periphery, a part of which is contiguous to the bottom and which will be described in more detail hereinafter.

The interior of the nozzle body 10 comprises an elongated receiving chamber 20 for the plastic material which is stored in the tank 12. This material is formed into a generally crescentic shape by the orifice 23. A cylindrical cutter sleeve 11, having a cutting edge 13 at its bottom, is fitted over nozzle body 10 and is mounted for vertical sliding movement relative thereto. By this arrangement, the enclosed plastic material can be forced through orifice 23 and formed to a desired shape by closing off orifice 23 in a predetermined, controlled manner, to be described more fully hereinafter.

Reciprocating motion is imparted to cutter sleeve 11 through a conventional coupling arrangement. A circumferentially grooved follower collar 15 is mounted on the upper end of the cutter sleeve 11 and is coupled via lever 17, which is centrally pivoted at 18, to a conventional controllable actuating means not shown. The actuating means, located at the left-hand end of lever 17, causes the lever to swivel about the relatively stationary pivot 18 as indicated by the arrows. The right-hand portion 19 of lever 17 is bifurcated and carries diametetrically opposed follower rollers 16 engaged within the groove of the follower collar 15. Thus, as lever 17 is moved in a vertical plane, reciprocal motion is imparted to the cutter sleeve 11 to move it from its normal position closing orifice 23 (position A shown in phantom in FIGS. 2 and 4) to the completely open position (position A" shown in solid lines in FIGS. 1, 2, and 4) and then back again to the closed position.

The chamber 20 receives the plastic material under pressure from the tank 12. The walls of the nozzle body 10 must therefore be designed to withstand this pressure which is applied to them when the cutter sleeve 11 completely closes off the orifice 23 (i.e. when sleeve 11 in position A shown in phantom in FIG. 2). The orifice 23 is a wedge-shaped cut-out bounded by two intersecting planes having a line of intersection which is perpendicular to the axis of the nozzle body 10. This orifice extends partially around the circumference of the nozzle body. Inasmuch as orifice 23 is bounded by two intersecting planes, it will hereinafter be referred to as a dihedral cut-out. The lower bounding surface of the orifice 23 coincides with the outer, lowermost edge of the sloping portion 21 of the bottom 22. As may be noted by reference to FIGS. 2 and 3, the bottom 22 also includes a horizontal portion 25. The upper bounding surface 24 of the orifice 23 lies in a plane which is parallel to but located slightly above the surface 25.

It has been found that the production of a flat bottom in formed bodies does not require that the surface 21 cover as large an area as is shown in the illustrative embodiment. Rather, if the orifice 23 is cut directly into the wall of nozzle body 10, the severed wall thickness which thereby forms a lower bounding surface for orifice 23, will produce a flat bottom on formed material if the severed wall forming the lower orifice boundary is inclined and is at least ⅛ inch thick. Furthermore, this thickness of the wall will produce a flat bottom on formed material regardless of the diameter of the nozzle body 10.

Figure 3:
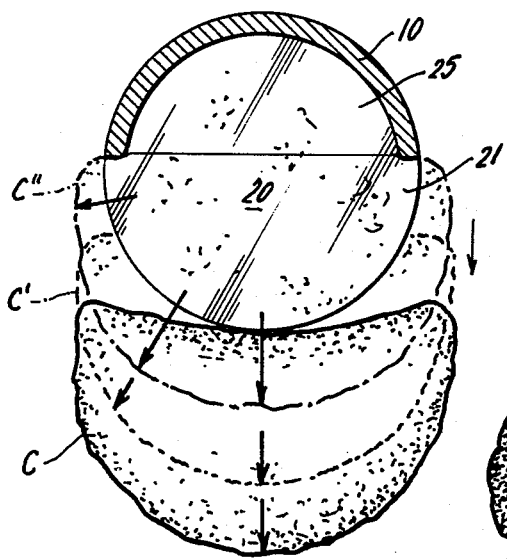
FIG. 3 is a rotated sectional view of FIG. 2, taken along line 3—3 and looking in the direction of the arrows, and showing a crescent, of the shape described, in various stages of formation.
Figure 4:
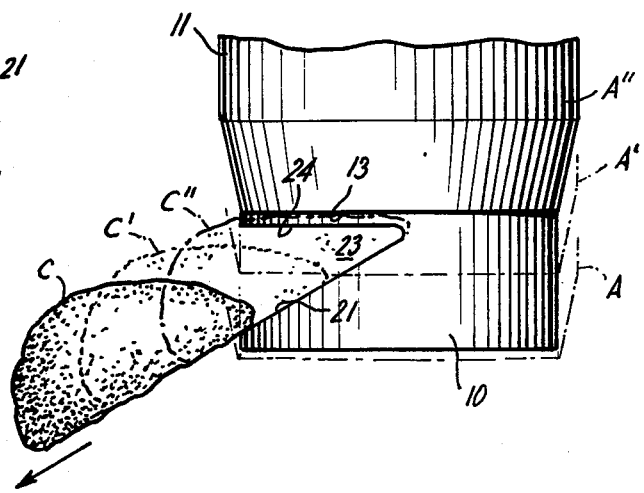
FIG. 4 is an enlarged view of the lower portion of the apparatus of FIG. 1 showing a crescent, of the shape described, in various stages of formation; and, FIG. 5 is an enlarged perspective view of the product of the apparatus of FIG. 1, which is a crescent having an arcuate top and a substantially flat bottom.

FIGS. 3 and 4 show successive stage C", C' and C in the formation of a crescent C, and are useful in describing the forming process. In operation, it takes a complete reciprocating cycle of cutting sleeve 11 to form a single crescent. During this cycle, the cutter sleeve 11 sequentially uncovers and covers the orifice 23 to define, on nozzle body 10, a forming aperture with a medial axis of symmetry and variable axial and circumferential extent. It will be appreciated that the moving cutting sleeve 11 and orifice 233 cooperate to define an aperture the size of which varies with time and that this variation can be controlled to the produce crescents of any desired shape.

As the cycle begins, cutting sleeve 11 is in normal position A where it completely closes off orifice 23 (see FIG. 4). As cutter sleeve 11 rises and opens the aperture, the pressurized plastic material begins to exit from the nozzle body 10 as it slides down inclined surface 21. As the cutter sleeve rises, the aperture continually expands both vertically and circumferentially. However, although the aperture changes in size, its shape is unchanged, as a result of proportional vertical and circumferential expansions occasioned by the fixed geometric relationship between the upper boundary of the aperture (i.e. cutting edge 13 or surface 24, depending on the position of the cutter sleeve 11) and its lower bounding surface (i.e. surface 21). This fixed relationship is attained by conforming cutting edge 13 to the shape of surface 24 (as best seen in FIG. 1, both are circular and lie in horizontal planes).

It will be noted that the aperture has a medial axis of symmetry and that, as it expands circumferentially, the plastic material is deposited at points along the nozzle body periphery which are further from this axis. This imparts a curved shape to the front of the exiting mass, as can be seen by referring to the partially formed crescent C" in FIG. 3. Also, as the aperture expands vertically (e.g. cutter sleeve moves from position A to position A" in FIG. 4), a greater volume of plastic material is forced through the aperture, so the exiting mass increases in height and eventually achieves a maximum height when orifice 23 is completely uncovered (cutter sleeve 11 in position A" in FIGS. 1, 2 and 4). As can be seen by referring to the partially formed crescent C, in FIG. 4, the expansion of the aperture imparts a curved shaped to the top of the exiting mass.

While the top part of the plastic material exiting from nozzle body 10 is being shaped by the rising cutter sleeve 11, the bottom part of the material slides down plane surface 21 and retains a substantially flat shape imparted by that surface. FIG. 4 best shows that arcuate top and flat bottom of the formed crescent C.

After the cutter sleeve 11 reaches its upper limit of travel (A" in FIG. 4), it starts down again. This downward movement imparts the opposite curve to the top of the exiting mass, since the aperture is continually being contracted both vertically and circumferentially. The cutter sleeve 11 continues descending, passing from position A" through position A' (see FIG. 4) until the aperture is completely closed (position A seen in phantom in FIG. 4).

When the aperture is completely closed, the crescent C is severed and the completed crescent drops away. By varying the rate at which the cutter sleeve 11 reciprocates and by varying the rate at which the plastic material is formed, as well as or in addition to the pressure thereon, crescents of different sizes and shapes can be achieved, all with a substantially flat bottom surface.

Although a specific embodiment has been disclosed for illustrative purposes, it will be apparent to one skilled in the art that many variations, additions and substitutions are possible without departing from the scope and spirit of the disclosure.

I claim:

1. An apparatus for forming a plastic substance into bodies each having a substantially flat bottom comprising a forming mechanism including a nozzle body with an orifice extending at least partially about its periphery, said nozzle body defining a chamber adapted to be connected in communication with a pressurized source of said plastic substance, said forming mechanism having a planar lower orifice bounding surface contiguous said orifice and inclined downwardly toward the exterior of said nozzle body, and cutting means mounted relative to said nozzle body in a manner to permit movement therebetween for selectively covering and uncovering said orifice.

2. The apparatus according to claim 1 in which said lower orifice bounding surface is at least partially included within said chamber.

3. The invention according to claim 1 including means maintaining said nozzle body stationary relative to said apparatus, said cutting means being a cutting sleeve mounted for sliding movement relative to said nozzle body.

4. The invention according to claim 1, said orifice being generally in the shape of a dihedral wedge cut into said nozzle body periphery.

5. The invention according to claim 1 further including means coupled to said cutting means for controllably moving said cutting means relative to said nozzle body to progressively uncover and cover said orifice so that said body may be formed with an arcuate top.

6. The invention according to claim 1 further including means coupled to said cutting means for controllably moving said cutting means relative to said nozzle body to progressively uncover and cover said orifice, said cutting means and said orifice constituting means being constructed and arranged so that moving said cutting means to uncover and cover said orifice defines a plastic substance-forming aperture of constant shape and progressively increasing and decreasing size.

7. The invention according to claim 6 in which said cutting means further includes a cutting edge constructed and arranged to substantially conform to the portion of the boundary of said orifice lying above said lower orifice bounding surface.

8. An apparatus for forming a plastic foodstuff into crescentic bodies having a substantially flat bottom surface, said apparatus comprising a forming mechanism including a generally cylindrical nozzle body with an orifice extending at least partially about its periphery, said apparatus having a planar lower orfice bounding surface within said nozzle body contiguous said orifice and lying in an inclined plane sloping downward toward the exterior of said nozzle body, said nozzle body defining a chamber adapted to be connected in communication with a pressurized source of said foodstuff, a cutting sleeve mounted on said nozzle body for reciprocal movement relative thereto and being constructed and arranged to selectively cover and uncover said orfice, and means coupled to at least one of said cutting sleeve and said nozzle body for controllably providing said reciprocal relative movement.

9. The apparatus according to claim 8 in which said orifice and said cutting sleeve are constructed and arranged to collectively define a foodstuff-forming aperture of an axial and circumferential extend varying with said relative movement so that said bodies are formed with a generally crescentic shape and a curved top.

10. The apparatus according to claim 9 in which said foodstuff-forming aperture has an axis of symmetry medially disposed along its circumferential extent, said cutting sleeve and said orifice constituting means being constructed and arranged to form unequal amounts of said foodstuff at a contiguous location along the circumferential extend of said foodstuff-forming aperture with a volume that decreases from said axis of symmetry toward the circumferential limits of said forming aperture.

11. The apparatus according to claim 8 including an upper orifice bounding surface lying in a plane intersecting said inclined plane so that said orifice is shaped like a radially directed dihedral wedge cut from the periphery of said nozzle body, said cutting sleeve having a cutting edge lying in a plane parallel to the plane of said upper bounding surface, said cutting edge and said orifice being constructed and arranged to collectively define an aperture for forming crescentic bodies having a top with a high medial portion and continuously decreasing height towards its edges.

* * * * *